Nov. 28, 1967  S. R. CAUSEY  3,354,715

WEATHER VANE FIXTURE

Filed July 29, 1964  2 Sheets-Sheet 1

INVENTOR.
STANLEY R. CAUSEY
BY
Charles B. Havenstock
ATTORNEY.

Nov. 28, 1967  S. R. CAUSEY  3,354,715

WEATHER VANE FIXTURE

Filed July 29, 1964  2 Sheets-Sheet 2

INVENTOR.
STANLEY R. CAUSEY
BY
Charles B. Haverstock
ATTORNEY,

United States Patent Office 3,354,715
Patented Nov. 28, 1967

3,354,715
WEATHER VANE FIXTURE
Stanley R. Causey, Rte. 1, Irondale, Mo. 63648
Filed July 29, 1964, Ser. No. 385,935
3 Claims. (Cl. 73—188)

The subject invention relates generally to weather vane fixtures and similar devices and more particularly to a weather vane fixture for installation and use on lamp posts and other similar structures.

Outdoor lightposts illuminated by electricity, gas and other means are in common usage and serve both functional and decorative purposes. There are many different kinds and shapes of such devices in use. The subject device is designed and constructed to be used with such devices and to increase the utility and attractiveness of such devices by providing in conjunction therewith means to indicate wind direction.

It is therefore a major object of the present invention to increase the utility of outdoor light standards and posts and the like by providing a fixture for use therewith to indicate wind direction.

Another object is to provide a relatively inexpensive fixture which can be installed on existing as well as new equipment.

Another object is to provide a weather vane fixture which can be used with electric, gas and other types of light fixtures and like devices.

Another object is to provide a fixture which can be installed using simple hand tools and without requiring any special training or skill.

Another object is to provide a fixture that has a minimum of wear parts.

Another object is to provide a relatively inexpensive fixture which makes an attractive addition to outdoor light posts and the like.

Another object is to provide means for indicating wind direction in daylight and in darkness.

These and other objects and advantages of the present invention will become apparent after considering the following detailed specification covering several preferred embodiments of the subject device in conjunction with the accompanying drawings, wherein.

Figure 1:
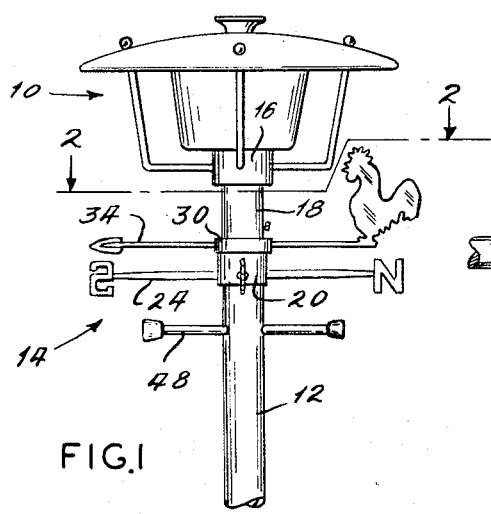
FIG. 1 is a fragmentary side elevational view of an outdoor light fixture and post equipped with a weather vane fixture constructed according to the present invention.
Figure 4:
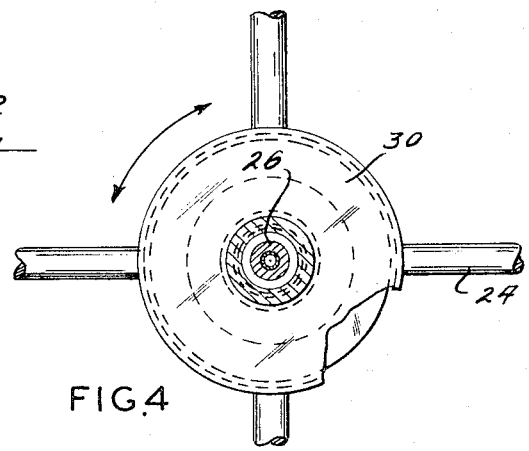
FIG. 4 is an enlarged cross-sectional view taken on line 4—4 of FIG. 3.
Figure 2:
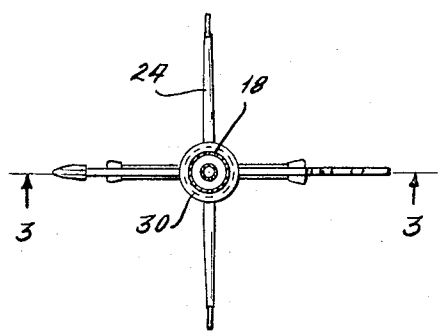
FIG. 2 is a cross-sectional view taken on line 2—2 of FIG. 1.
Figure 5:
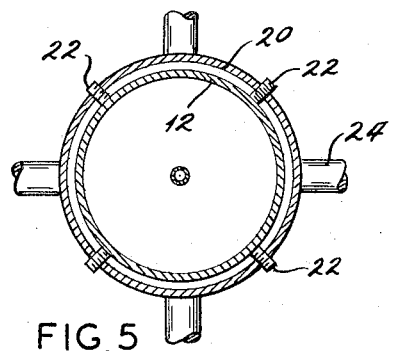
FIG. 5 is an enlarged fragmentary cross-sectional view taken on line 5—5 of FIG. 3.
Figure 3:
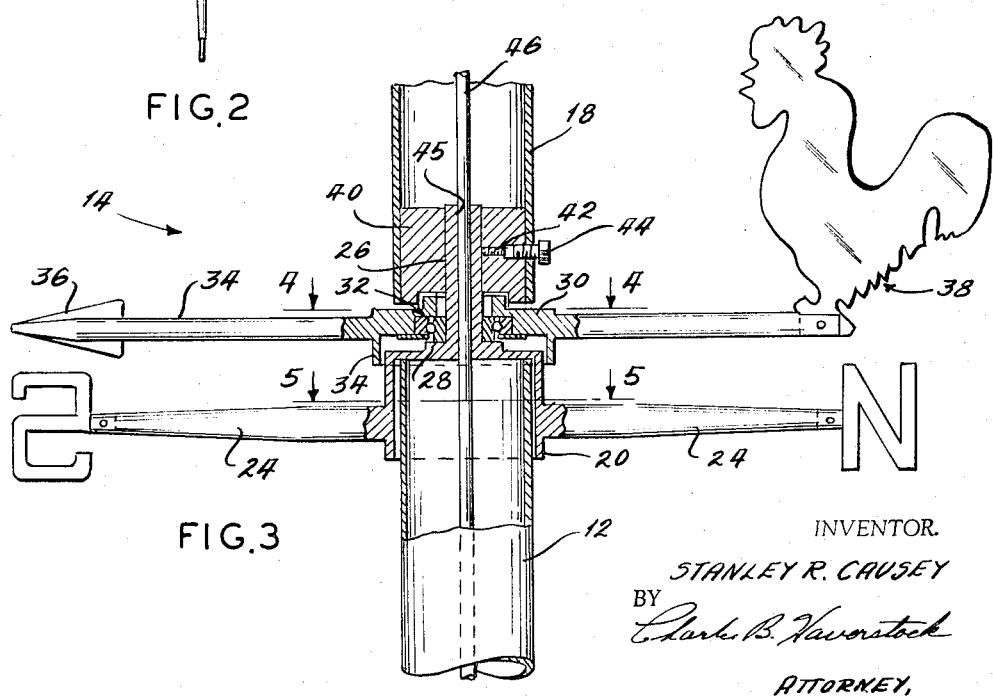
FIG. 3 is an enlarged fragmentary cross-sectional view taken on line 3—3 of FIG. 2.

Referring to the drawings more particularly by reference numbers, number 10 refers to a light fixture mounted on a post 12 with a weather vane fixture 14 positioned between the post and the light fixture. The light fixture 10 and the post 12 can be of a conventional construction and design and the fixture can include a fitting 16 which is normally mounted directly on the post 12. However, in the construction shown in FIG. 1, the weather vane fixture 14 is positioned between the post 12 and the fixture 10, and a connecting member 18 of approximately the same diameter as the post is connected to the fitting 16 as shown.

The details of the construction of the weather vane fixture 14 are shown in FIGS. 1–5. Referring to FIG. 1, the fixture 14 is shown including a hub portion 20 which is mounted on the upper end of the post 12 and locked in position thereon by one or more set screws 22, four being shown in FIG. 5. Attached to the hub portion 20 are four similar outwardly extending arms 24 spaced at 90° intervals therearound. When the fixture 14 is mounted on the post 12, the arms 24 are oriented to point in north, south, east and west directions. Each of the arms 24 may be provided with a suitable letter to identify the direction in which it points.

The hub portion 20 also has an integral smaller diameter upwardly extending portion 26, and a shoulder 28 is formed on the hub portion 20 at the juncture between the portions 20 and 26.

A rotatable member 30 is mounted on the hub portion 26 adjacent to the shoulder 28 and includes a bearing assembly 32 on which it rotates. The rotatable member 30 has a downwardly extending annular flange 34 (FIG. 3) which overlaps the upper end of the hub portion 20 to prevent rain, dirt and other foreign matter from getting into the bearing assembly 32. A direction indicating arrow 34 including a head portion 36 and a tail or vane portion 38 is attached to rotating member 30 and rotates to a position depending on the wind to point in the direction from which the wind is blowing. The head portion 36 of the arrow 34 is shown in the form of an arrowhead and the tail or vane portion of the arrow 38 is shown as a decorative rooster which has a large enough area to catch the wind and control the direction in which the arrow points. It is also desirable to have the arrow as evenly balanced as possible to permit the freest possible rotation of the member 30.

A tubular adapter member 40 is mounted on the upwardly extending portion 26 of the member 20 spaced above the rotatable member 30 and is fastened thereto by one or more set screws 42. The connecting member or tube 18 on which the light fixture assembly 10 is mounted is positioned on the tubular member 40 and is secured thereto by other set screws such as the set screw 44 and a cooperating hole in the member 40.

The member 20 including its integral portion 26 has a vertical bore 45 therethrough which is large enough to receive a gas line 46 for a gas light fixture or an electrical conduit for an electrical fixture. The gas or electrical connections for the lamp are of a usual construction and are not effected by the subject assembly.

It should now be apparent that the subject fixture is constructed to be installed on new and on existing lightposts or standards between the top of the post and the light fixture assembly. Little or no modification of the existing structure is required unless for some reason the post is to be shortened to maintain the original lamp height. It may also be desired to provide a suitable length of tube 18 between the lamp assembly and the subject fixture to improve the appearance of the structure. It should also be noted that the members 18 and 40 are stationary members, and that the member 18 should be spaced from and preferably overlap the upper portion of rotatable member 30 so that the rotatable member is free to rotate and also to protect the inner portions of the assembly from the elements and from foreign substances. The lightpost can also be provided with other structural and ornamental features such as the cross member 48 or an address assembly or the like.

Figure 6:
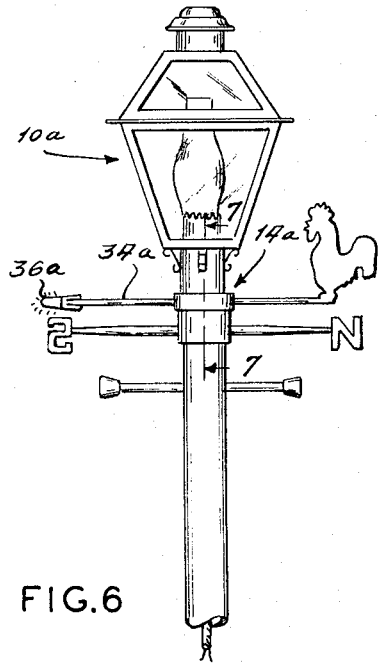
FIG. 6 is a fragmentary elevational view showing a modified form of outdoor light fixture employing a weather vane fixture constructed according to the present invention.
Figure 7:
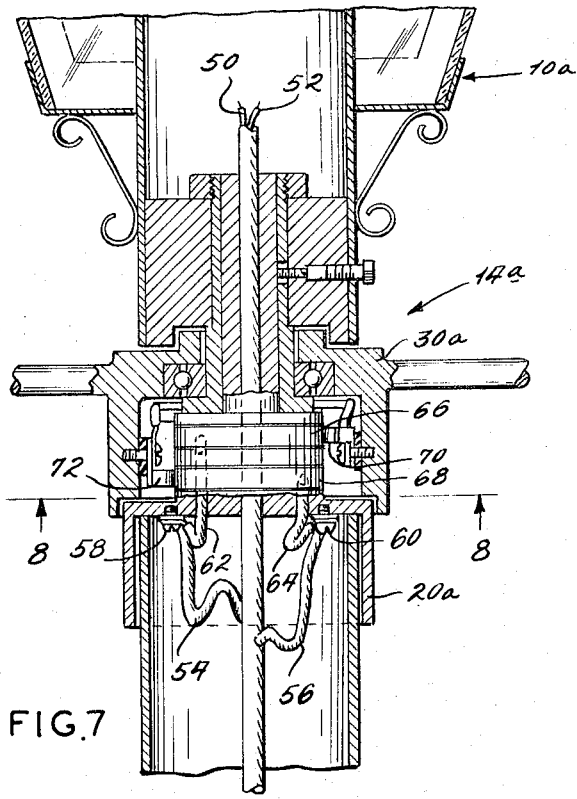
FIG. 7 is an enlarged fragmentary cross-sectional view taken on line 7—7 of FIG. 6; and, FIG. 8 is a cross-sectional view taken on line 8—8 of FIG. 7.
Figure 8:
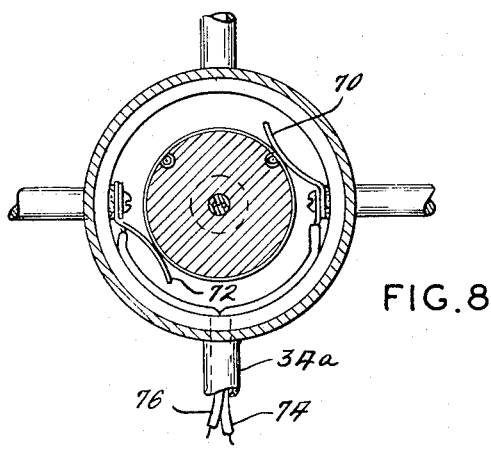

FIGS. 6–8 show a modified form of the subject fixture specifically designed to be mounted on an electrical outdoor lamp post assembly or the like. The modified structure differs from the previously described structure because it includes means for illuminating the pointer end 36a of the rotating arrow 34a. The pointer 36a in this case is an electric light bulb. Referring to FIG. 7 the electrical connections are shown as including two wires 50 and 52 which extend through the modified fixture 14a for energizing the light bulb in the light fixture 10a. The other input wires 54 and 56 (which may be offshoots of the wires 50 and 52) are connected to terminals 58 and 60 respectively in the bottom portion 20a of the weather vane fixture 14a. The terminals 58 and 60 are connected by other wires 62 and 64 respectively to annular non-rotatable conductors or commutators 66 and 68 respectively. The annular conductor 66 is slidably engaged by a rotating conductor blade or brush 70 which is mounted on the inner surface of the rotatable member 30a, and the annular conductor 68 is similarly slidably engaged by another rotating blade or brush 72 also mounted on the rotatable member 30a. The blades 70 and 72 are connected to wires 74 and 76 which extend through the arrow 34a to energize the light bulb 36a which will be illuminated in all directions of the arrow to indicate the direction from whence the wind is blowing.

The particular constructions shown and described herein have been selected for illustrative purposes only, and it will be apparent to those skilled in the art that many other lamp designs and constructions of the subject fixture are possible and could be used.

Thus there has been shown and described several embodiments of a novel weather vane fixture or the like which fulfills all of the objects and advantages sought therefor. As already noted, however, many changes, modification, alterations, and other uses and applications for the subject device will become apparent to those skilled in the art after considering this specification and the accompanying drawings. All such changes, alterations, modifications, and other uses and application thereof which do not depart from the spirit and scope of the invention are deemed to be covered by the invention which is limited only by the claims which follow.

What is claimed is:

1. A weather vane fixture in combination with a light fixture assembly and support means therefor comprising a light fixture assembly and support means therefor, a weather vane fixture mounted in said support means at an intermediate location spaced from the light fixture assembly, said weather vane fixture comprising a first member fixedly attached to the support means and a second member including bearing means rotatably mounted on said first member, said first member having a portion that extends upwardly through the second member, means including an extension of the support means attached at one end to said first member and at the opposite end to the light fixture assembly, conduit means extending through said support means including the extension thereof and through said weather vane fixture for connection to said light fixture assembly to supply energy thereto, said second member having a weather vane thereon that rotates in response to wind direction, said weather vane including means thereon for pointing in the direction from which the wind is blowing including a member having a pointer portion on one end and a vane portion on the opposite end, electric light producing means mounted on said pointer portion, commutator means including an annular electrically conductive band mounted on said first member, an electrically conductive wiper mounted on said second member, said wiper moving on and engaging said annular band in every position of the second member, and means including electrical connection means associated with the conduit means and connected to the commutator means to supply electrical energy thereto for energizing the light producing means on the pointer portion of the weather vane in all positions thereof.

2. The combination defined in claim 1 wherein an anti-friction bearing assembly is positioned having a first portion engaged with the first member, a second portion engaged with the second member, and anti-friction members positioned between said first and second portions.

3. The weather vane fixture defined in claim 1 wherein said first member includes radially outwardly extending arm portions to indicate geographic direction.

References Cited

UNITED STATES PATENTS

| | | | |
|---|---|---|---|
| 631,161 | 8/1899 | Froehlich et al. | 116—173 X |
| 1,122,434 | 12/1914 | Steffs | 73—188 X |
| 1,776,111 | 9/1930 | Donaldson | 73—189 |
| 1,968,838 | 8/1934 | Lanagan | 73—189 |
| 3,094,286 | 6/1963 | Harling | 240—25 |
| 3,119,261 | 1/1964 | Bonanno | 73—189 |

RICHARD C. QUEISSER, *Primary Examiner.*

J. J. SMITH, JERRY W. MYRACLE,
*Assistant Examiners.*